United States Patent
Rouaud et al.

(10) Patent No.: US 12,502,832 B2
(45) Date of Patent: Dec. 23, 2025

(54) OHMIC-HEATING PRINTHEAD FOR 3D PRINTER

(71) Applicants: ECOLE NATIONALE VETERINAIRE AGROALIMENTAIRE ET DE L'ALIMENTATION NANTES ATLANTIQUE, Nantes (FR); INRAE, Paris (FR)

(72) Inventors: Olivier Rouaud, Orvault (FR); Monique Khodeir, Nantes (FR); Anthony Ogé, Fay de Bregtagne (FR); Alain Le Bail, Nantes (FR); Patricia Le Bail, Nantes (FR); Vanessa Jury, Saint-Herblain (FR)

(73) Assignees: ECOLE NATIONALE VETERINAIRE AGROALIMENTAIRE ET DE L'ALIMENTATION NANTES ATLANTIQUE, Nantes (FR); INRAE, Paris (FR)

( * ) Notice: Subject to any disclaimer, the term of this patent is extended or adjusted under 35 U.S.C. 154(b) by 135 days.

(21) Appl. No.: 18/284,231

(22) PCT Filed: Mar. 31, 2022

(86) PCT No.: PCT/EP2022/058707
§ 371 (c)(1),
(2) Date: Sep. 26, 2023

(87) PCT Pub. No.: WO2022/207876
PCT Pub. Date: Oct. 6, 2022

(65) Prior Publication Data
US 2024/0365796 A1    Nov. 7, 2024

(30) Foreign Application Priority Data
Apr. 2, 2021 (FR) ..................... 2103446

(51) Int. Cl.
*B29C 64/295* (2017.01)
*A21C 11/00* (2006.01)
(Continued)

(52) U.S. Cl.
CPC ............ *B29C 64/295* (2017.08); *A21C 11/00* (2013.01); *A23P 30/20* (2016.08); *B29C 64/209* (2017.08); *B33Y 30/00* (2014.12); *H05B 3/0004* (2013.01)

(58) Field of Classification Search
CPC ............................. B29C 64/295; A23P 30/20
See application file for complete search history.

(56) References Cited

U.S. PATENT DOCUMENTS

| 6,280,785 B1 * | 8/2001 | Yang ..................... B33Y 30/00 425/375 |
| 10,624,383 B1 * | 4/2020 | Christie ................. A23P 30/20 |

(Continued)

FOREIGN PATENT DOCUMENTS

DE    102018220192 A1 *  5/2020  ............... A21B 3/07

OTHER PUBLICATIONS

Le-Bail et al, Recent advances and future perspective in additive manufacturing of foods based on 3D printing, Current Opinion in Food Science, 2020, 35:54-64 (Year: 2020).*

(Continued)

*Primary Examiner* — Timothy Kennedy
(74) *Attorney, Agent, or Firm* — Williams Mullen; R. Brian Drozd

(57) ABSTRACT

A printhead for a 3D printer includes two large walls and two small walls that define between them a right-angled parallelepipedal cavity. Each small wall is produced from an electrically non-conductive material, and each large wall includes a central wall and two lateral walls on either side of the central wall. Each lateral wall is produced from electri- (Continued)

cally non-conductive material. The two central walls: face each other, are produced from an electrically conductive material, and are electrically connected to an electricity generator that generates an alternating current and an electrical potential difference between them.

10 Claims, 4 Drawing Sheets

(51) Int. Cl.
  *A23P 30/20* (2016.01)
  *B29C 64/209* (2017.01)
  *B33Y 30/00* (2015.01)
  *H05B 3/00* (2006.01)

(56) References Cited

U.S. PATENT DOCUMENTS

| | | | | |
|---|---|---|---|---|
| 11,304,437 | B1* | 4/2022 | Fu | B29C 48/06 |
| 2015/0150288 | A1* | 6/2015 | Tutuncu | A23L 7/109 |
| | | | | 426/451 |
| 2017/0173879 | A1* | 6/2017 | Myerberg | B22F 12/53 |
| 2018/0304370 | A1* | 10/2018 | Myerberg | G05B 19/4099 |
| 2019/0344520 | A1* | 11/2019 | Sadeghi | B32B 27/36 |
| 2023/0405924 | A1* | 12/2023 | Safavi-Ardebili | B29C 64/393 |

OTHER PUBLICATIONS

Rouaud O, Khodeir M, Jury V, Oge A, Le Bail P, Le Bail A: Study of continuous cake pre-baking in a rectangular channel using ohmic heating. ICEF 13—Melbourne Australia Sep. 23-26, 2019 (Year: 2019).*
Jul. 11, 2022 International Search Report issued in International Patent Application No. PCT/EP2022/058707.
Jul. 11, 2022 Written Opinion issued in International Patent Application No. PCT/EP2022/058707.
Khodeir et al; "Study of continuous cake pre-baking in a rectangular channel using ohmic heating;" Innovative Food Science and Emerging Technologies; vol. 67; Nov. 30, 2020.

* cited by examiner

[Fig. 1]
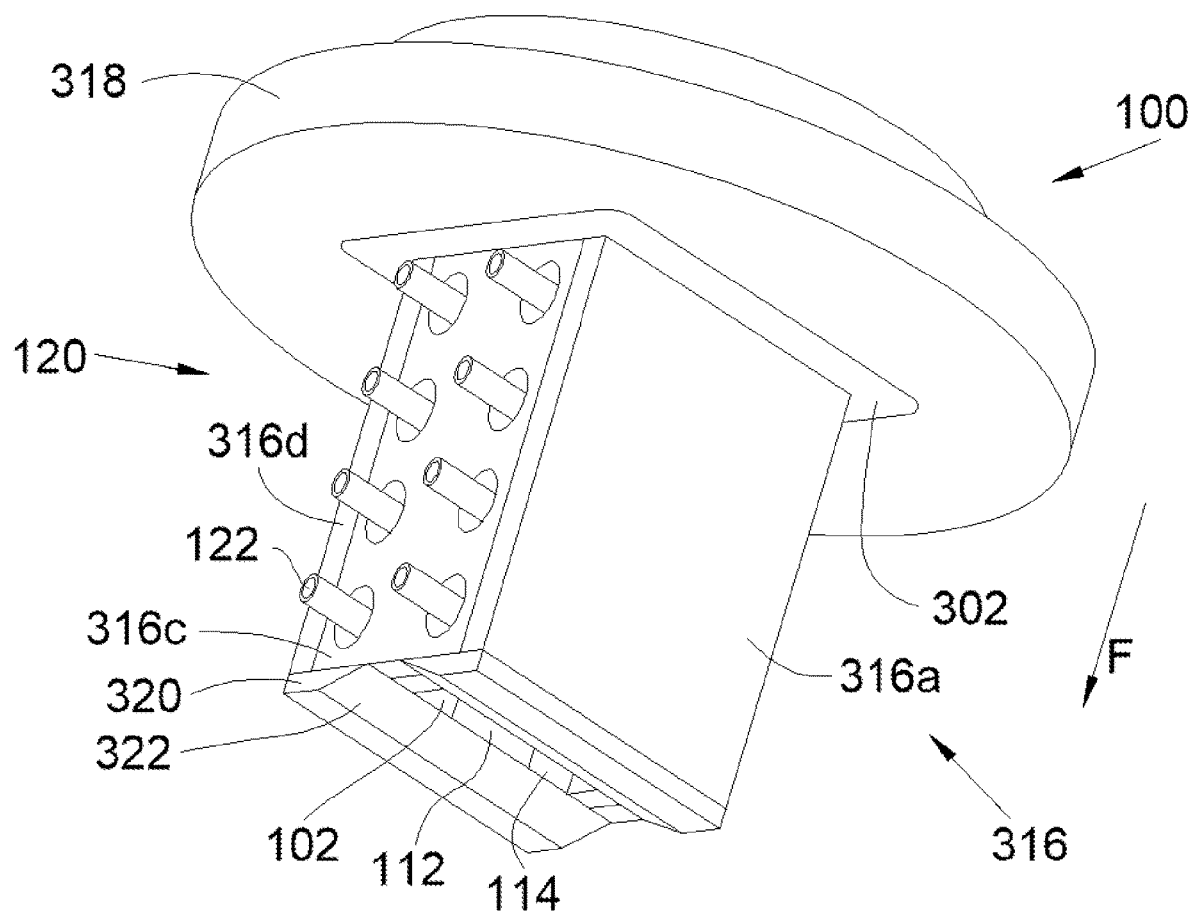

[Fig. 2]
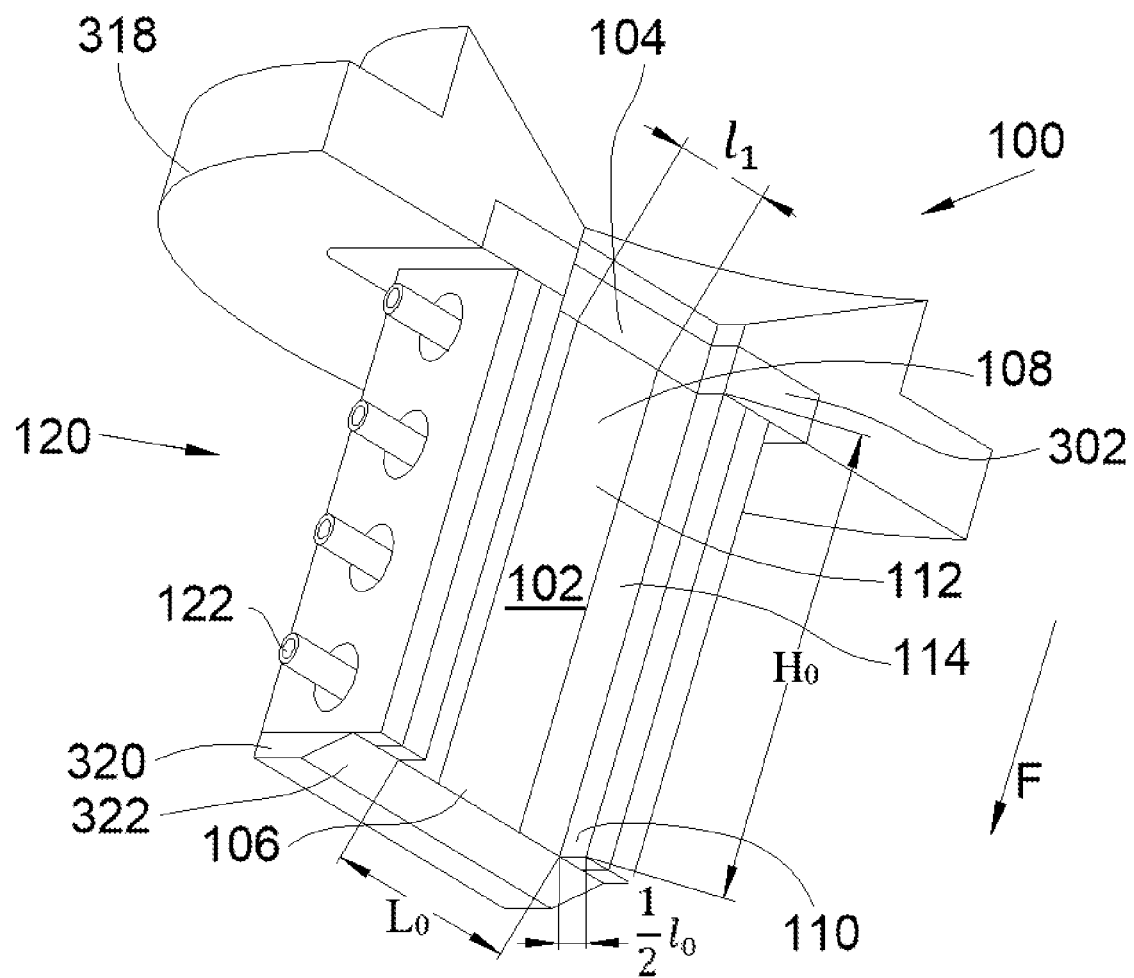

[Fig. 3]
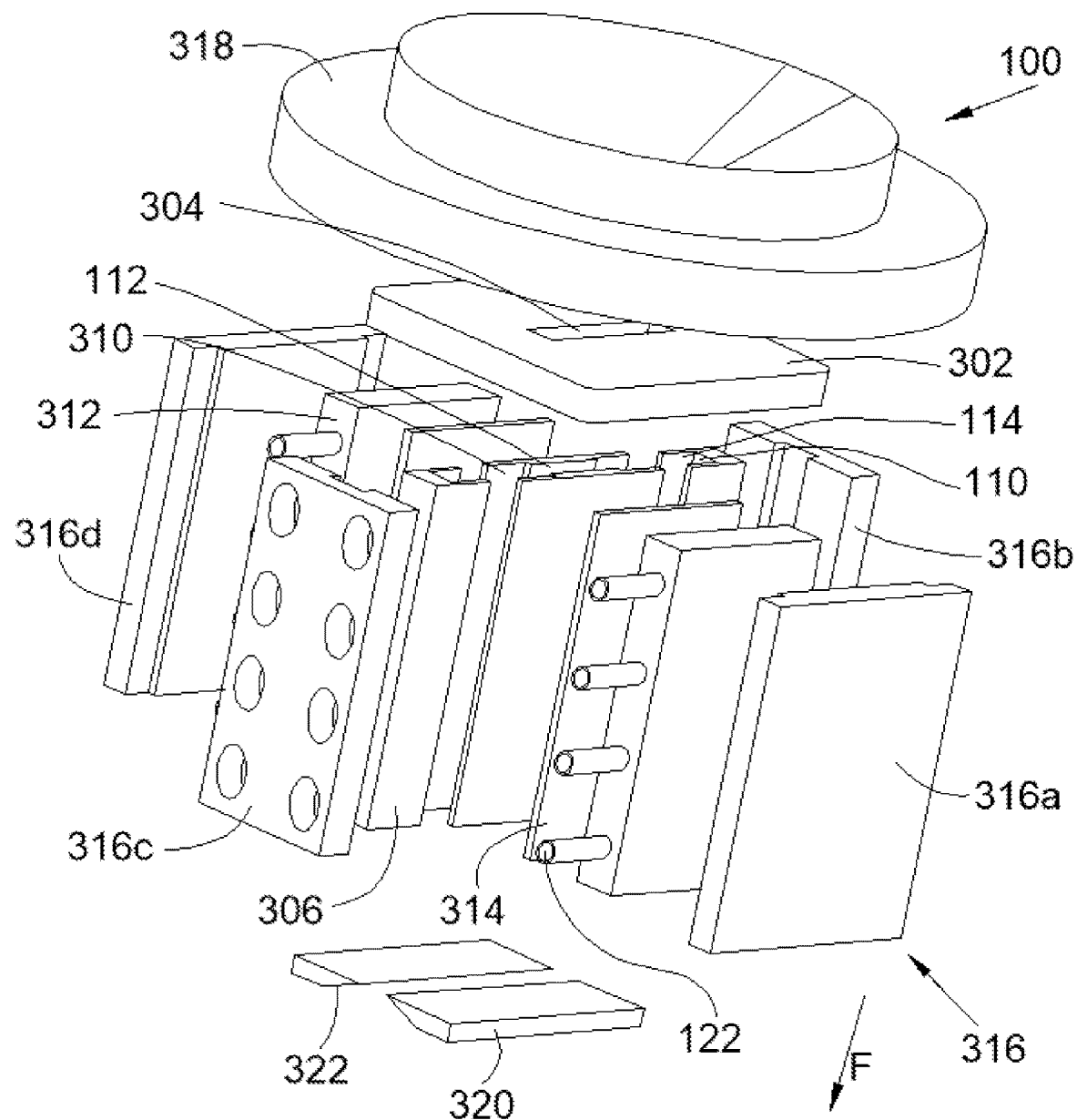

[Fig. 4]
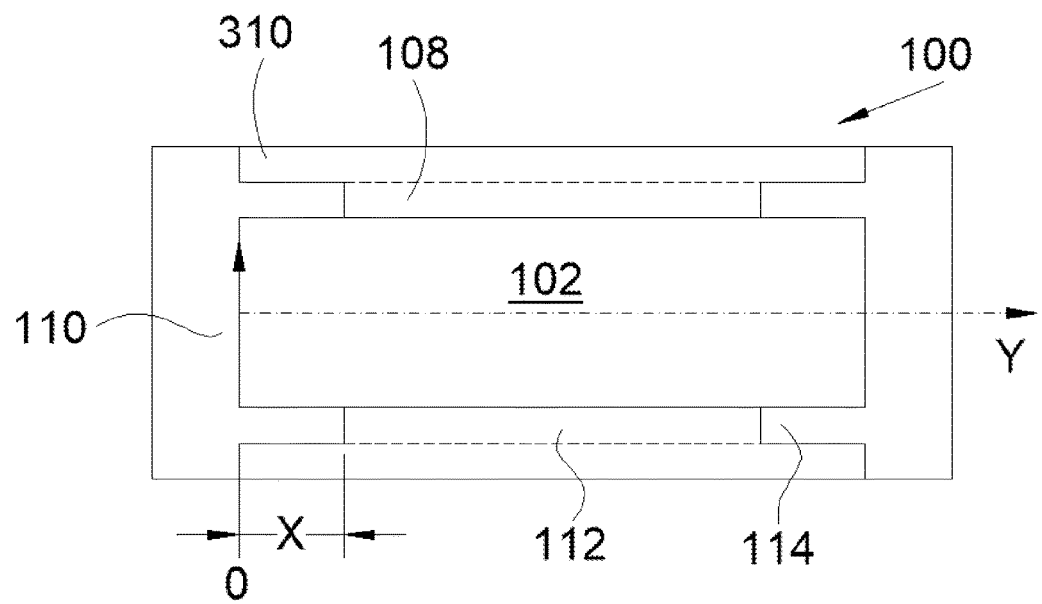
[Fig. 5]
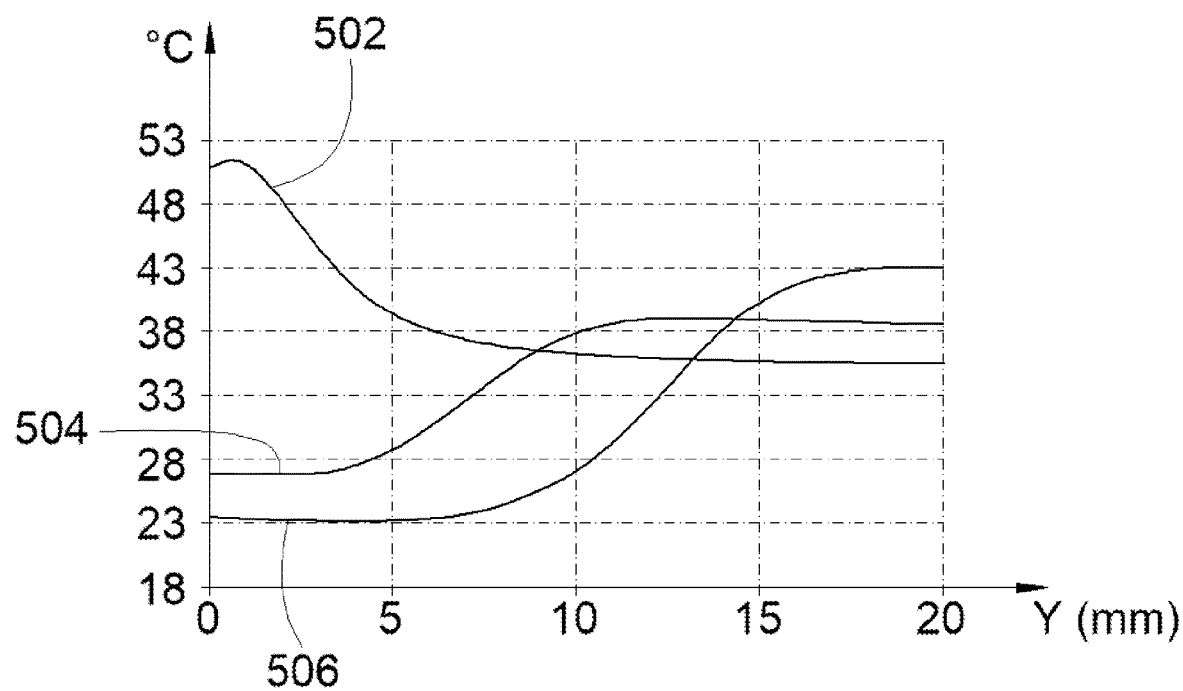

OHMIC-HEATING PRINTHEAD FOR 3D PRINTER

TECHNICAL FIELD

The present invention relates to an ohmic-heating printhead for a 3D printer (3 dimensions), in particular in the field of breadmaking products such as for example cakes, gateaux, bread, etc, and more generally doughy products of the alveolar foam type that solidify under the action of heat. The present invention also relates to a 3D printer comprising such a printhead.

PRIOR ART

For several years, 3D printing technology has made it possible to produce food products. A 3D printer making it possible to implement such a method generally comprises a reservoir of fluid product, for example of the syringe or cartridge type, the outlet end of which is equipped with a printhead. Pressure in the reservoir expels the product through the outlet and this pressure is produced by a piston in the syringe or compressed air in the cartridge. The expelled product is for example a printing ink, usually a gel or an unbaked dough for cereal products.

Another type of 3D printer comprises a powder bed, for example a mixture of flour and fats, which is heated and baked in a very localised manner by a power laser. This type of device is used for producing for example biscuits.

Another type of 3D printer comprises a hopper that discharges above a horizontal-axis worm that brings the product to the printhead.

When the product is chocolate, the printhead incorporates heating members such as for example resistive elements.

The use of such a printhead in the field of breadmaking products, and more generally doughy products of the alveolar foam type that solidify under the action of heat, is not possible since the fluid product has a tendency to solidify in the printhead at the heated wall. The result is then adhesion of the product to the heated walls (overbaked zones) because of the rigidification of the baked dough on the surface whereas the central part of the flow would still be fluid since it is not baked. This imbalance in baking would be liable to cause clogging of the printhead.

The document «Study of continuous cake pre-baking in a rectangular channel using ohmic heating" by Khodeir et al discloses a printhead of the prior art.

It is therefore necessary to find a technology limiting the appearance of overbaked zones.

DISCLOSURE OF THE INVENTION

One object of the present invention is to propose a printhead for a 3D printer.

For this purpose, a printhead for a 3D printer is proposed, said printhead comprising:
- two large walls parallel to each other and facing each other, and
- two small walls parallel to each other and facing each other, and perpendicular to the large walls,
- where the four walls define between them a cavity taking the form of a right-angled parallelepiped that extends between an inlet and an outlet that face each other and define between them a discharge direction,
- where each small wall is produced from an electrically non-conductive material,
- where, in the cavity, each large wall comprises a central wall and two lateral walls on either side of the central wall,
- where each lateral wall is produced from an electrically non-conductive material, and
- where the two central walls face each other, are produced from an electrically conductive material, and are intended to be electrically connected to an electricity generator that generates an alternating current and a difference in electrical potential between them.

With such an arrangement, the dough present in the printhead between the electrodes is heated only in a restricted volume and thus leaves a layer of unbaked fluid dough along the walls and thus limits the risks of clogging.

Advantageously, the cavity has a length $L_0$, the central wall has a width $l_1$ that is parallel to and less than the length $L_0$, and each lateral wall has a width that is equal to half the difference between the length $L_0$ of the cavity and the width $l_1$ of the central wall.

Advantageously, for each large wall, the central wall and the two lateral walls constituting said large wall are coplanar in the cavity.

Advantageously, the printhead comprises a cooling system arranged at the rear of the large walls with respect to the cavity.

Advantageously, the printhead comprises a metal plate that is secured to the central wall and is at the rear of the central wall with respect to the cavity, where the metal plate has a width greater than the width of the central wall and extends on either side of the central wall, each small wall and the two lateral walls that are adjacent form a single element taking the form of a U-shaped section, each central wall is positioned between and in line with the two lateral walls of two different U-shaped sections, and each metal plate is positioned at the rear of the lateral walls framing the associated central wall.

Advantageously, the cooling system takes the form of two heat exchangers in which tubes supplied with a heat-transfer fluid circulate, where each heat exchanger is set against the rear of one of the metal plates.

Advantageously, for each heat exchanger, the printhead comprises a protective plate consisting of an electrically insulating material and disposed between the metal plate and the heat exchanger.

Advantageously, downstream of the outlet, the printhead comprises two blocks disposed on either side of the outlet, and each block has an inclined plane that extends the large wall and moves away outwards while progressing in the direction of the discharge direction.

The invention also proposes a 3D printer comprising a printhead according to one of the previous variants.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 1 is a perspective view of a printhead according to the invention,

FIG. 2 is a perspective view in cross section of a printhead of FIG. 1 through a vertical midplane, FIG. 3 is an exploded view of the printhead of FIG. 1, FIG. 4 is a plan view in cross section of the cavity of the printhead of FIG. 1, and FIG. 5 is a graph representing the heat distribution inside the cavity of the printhead.

DETAILED DISCLOSURE OF EMBODIMENTS

FIGS. 1 to 3 show a printhead 100 that is used in the context of a 3D printer, in particular in the field of breadmaking products, and more generally doughy products of the alveolar foam type that solidify under the action of heat.

According to one example, the 3D printer moreover comprises a reservoir for storing the dough which, as in the prior art, can take the form of a syringe or of a cartridge equipped with an outlet through which the dough is expelled under a pressure exerted in the reservoir. The 3D printer can also take the form of a hopper with a worm as in the prior art, or any other suitable type of 3D printer. The printer is not described any further since it can consist of any printer of the prior art where only the printhead is different. Thus any other type of printer can be used in the context of the invention.

The dough is thus conducted towards the printhead.

The flexible dough is brought to the printhead 100 and flows into a cavity 102 of the printhead 100. The cavity 102 has an inlet 104 at the top part and an outlet 106 at the bottom part. The cavity 102 takes the form of a right-angled parallelepiped that extends between the inlet 104 and the outlet 106, which then each take the form of a rectangle.

The dough that is introduced into the cavity 102 through the inlet 104, emerges through the outlet 106 and therefore flows parallel to a discharge direction represented by the arrow F that is oriented vertically from top to bottom to facilitate the movement of the dough by gravity in combination with the system that is upstream of the printhead 100 and pushes the dough. The inlet 104 and the outlet 106 are thus facing each other and define between them the discharge direction F.

The dimension parallel to the discharge direction F is called the "height $H_0$" of the cavity.

The two dimensions of the cavity that are perpendicular to the height $H_0$ are called "length $L_0$" and "width $l_0$" of the cavity 102, where the length is the largest dimension and the width is the smallest dimension. If the length $L_0$ and the width $l_0$ are equal, the cavity 102 has a square cross section. Since FIG. 2 is a cross section through a midplane, only the half-width $$\left(\frac{1}{2} * l_0\right)$$

is visible.

According to a particular embodiment of the invention, the length $L_0$ is between 5 and 40 mm, the width $l_0$ is between 2 and 10 mm and the height $H_0$ is between 10 and 100 mm.

The cavity 102 is thus delimited by four lateral walls, namely two large walls 108 and two small walls 110. The large walls 108 are those the surface area of which is equal to the product of the length $L_0$ and the height $H_0$ and the small walls 110 are those the surface area of which is equal to the product of the width $l_0$ and the height $H_0$. The two large walls 108 are parallel to each other and facing each other and the two small walls 110 are parallel to each other and facing each other. The small walls 110 and the large walls 108 are perpendicular to each other and define between them the cavity 102.

Each small wall 110 is produced from an electrically non-conductive material such as for example from polycarbonate.

Each large wall 108 comprises a central wall 112 and two lateral walls 114. The central wall 112 extends between the inlet 104 and the outlet 106, i.e. over the height $H_0$ of the cavity 102, and has a width 11 that is parallel to and less than the length $L_0$ of the cavity 102. The two lateral walls 114 extend on either side of the central wall 112, which is centred on the large wall 108. Each lateral wall 114 extends between the inlet 104 and the outlet 106, i.e. over the height $H_0$ of the cavity 102, and has a width that is equal to half the difference between the length $L_0$ of the cavity 102 and the width $l_1$ of the central wall 112.

For each large wall 108, the central wall 112 and the two lateral walls 114 constituting said large wall 108 are coplanar in the cavity 102 to ensure a smooth face of the dough at the outlet.

Each lateral wall 114 is produced from an electrically non-conductive material such as for example from polycarbonate. Each central wall 112 is produced from an electrically conductive material and, as explained below, each central wall 112 is electrically supplied and thus constitutes an electrode. The electrically conductive material is for example stainless steel, titanium, etc.

Thus, in the cavity 102, each large wall 108 comprises a central wall 112 and two lateral walls 114 on either side of the central wall 112. The particular designs of the central wall 112 and of the lateral walls 114 avoid heating at the lateral walls 114.

The two central walls 112 therefore face each other and constitute two facing electrodes.

According to a particular embodiment, the length $L_0$ of the large wall 108 is between 5 and 40 mm, and the width $l_0$ of the cavity 102 is between 2 and 10 mm. According to a particular configuration, the width 11 is 35 mm, the length $L_0$ is 40 mm and the width $l_0$ is 10 mm.

In general terms, the ratio $$\frac{L_0 - l_1}{l_0}$$

is greater than 0.5 with a tolerance of ±0.1 depending on the dough used.

According to a particular embodiment, for a product $L_0 * l_0$ varying from 5*2 to 40*2, the length ($L_0 - l_1$) is greater than or equal to 1 mm, i.e. each electrically non-conductive lateral wall 114 has a width of 0.5 mm.

According to a another particular embodiment, for a product $L_0 * l_0$ varying from 5*10 to 40*10, the length ($L_0 - l_1$) is greater than or equal to 5 mm, i.e. each electrically non-conductive lateral wall 114 has a width of 2.5 mm.

In general terms, the length $L_0$ is greater than or equal to the width $l_0$.

These values can vary according to the dough used, the solidification temperature of the dough, the width $l_0$ of the cavity 102, etc.

The two central walls 112 are electrically connected to an electricity generator that generates an alternating current and generates a difference in electrical potential between them. The electrical connection is implemented by a suitable electric cable.

According to a particular embodiment, the difference in electrical potential is between 175 V and 180 V and the frequency is between 50 and 60 Hz, in particular in the case of central walls 112 made from titanium or platinised titanium. Naturally different values are possible according to the flow rate of the dough in the cavity 102 and the dimensions of the printhead 100, the required temperature, as in the example described below where the difference in potential is 65 V, and higher frequencies of the order of 20 kHz can also be used, in particular in the case of central walls 112 made from stainless steel.

When the dough passes through the cavity 102, it is subjected to the potential difference between the two central walls 112, and under the effect of this potential difference the dough has an electric current pass through it and is heated by Joule effect. This heating is also called "ohmic heating" and it can thus be implemented without its being necessary to install heating means in the printhead 100.

The fact that the width l1 of the central walls 112 is always less than the length $L_0$ of the cavity 102, the dough is less heated and in particular is not heated at the small walls 110 and lateral walls 114, which are electrically non-conductive, which prevents the dough in contact with these walls solidifying. Along these walls, the dough remains flexible and unbaked, avoiding the risks of clogging by solidification.

Only the portion of the dough that is between the central walls 112 heats and the heat is thus diffused slowly through the rest of the dough, which does not have time to solidify before emerging from the cavity 102.

FIG. 4 shows a view in cross section of a printhead 100 and FIG. 5 shows temperature curves as a function of the distance in the direction Y to one of the small walls 110 for various widths (X) of the lateral walls 114.

The curves in FIG. 5 result from a numerical simulation for a flow rate of dough of $1.55 \times 10^{-3}$ kg/s, a difference in electrical potential of 65 V, a length $L_0$ of the cavity 102 of 4 cm, and a width $l_0$ of the cavity 102 of 1 cm.

The curve 502 represents the prior art without lateral wall 114, i.e. a width of the lateral walls 114 equal to X=0. The temperature along the small walls 110 (at 0 mm) is high ($\approx 50°$ C.), which can lead to solidification of the dough along these walls and therefore a possibility of clogging of the cavity 102.

The curve 504 represents the invention for a width of the lateral walls 114 equal to X=0.75 cm. The curve 506 represents the invention for a width of the lateral walls 114 equal to X=1.25 cm.

For the curves 504 and 506, the temperature along the small walls 110 (at 0 mm) is lower ($\approx 27°$ C./24° C.), which, by remaining below the solidification temperature of the dough, avoids solidification of the dough along the walls 108 and 110 and keeps a flexible dough, while guaranteeing thorough baking when moving away from the walls 108 and 110 with a temperature of around 40° C.

As shown by FIG. 5, the temperature profile is inverted between the prior art and the invention, thus making it possible to maintain a fluid dough level on the periphery while making it possible to achieve a solidification temperature at the heart of the dough. This fluid phase furthermore facilitates adhesion of the successive printed layers at the outlet from the printhead 100, when one printed layer is deposited on another layer printed previously. The heat that is at the heart of the dough tends to diffuse towards the periphery while causing at least partial solidification of the junction zone between two successive layers, thus providing better cohesion of the whole.

To best control the distribution of the heat in the cavity 102 and, if needed, to keep the temperature close to the walls 108 and 110 below the solidification temperature, the printhead 100 furthermore comprises a cooling system 120 that provides the cooling of the printhead 100. The cooling system 120 is arranged at the rear of the large walls 108 with respect to the cavity 102.

In the embodiment of the invention presented here, the cooling system 120 takes the form of a plurality of tubes 122 in which a heat-transfer fluid circulates, and these tubes 122 are distributed at the rear of the large walls 108 with respect to the cavity 102. The tubes 122 are fluidically connected to an external reservoir and to an external heat exchanger. The heat-transfer fluid is circulated from the reservoir by a pump and circulates in the printhead 100 to be loaded with calories and then rejoins the external heat exchanger where the calories are discharged to a cold source before returning to the reservoir.

According to another embodiment, the cooling system 120 could function by Peltier effect.

FIG. 3 shows an exploded view of the printhead 100 according to a particular embodiment The printhead 100 comprises a top plate 302 having a slot 304 that is rectangular and represents the inlet 104.

Each small wall 110 and two lateral walls 114 that are adjacent form one and the same element taking the form of a U-shaped section 306 where the bottom of the U constitutes the small wall 110 and where each arm of the U constitutes a lateral wall 114. The two U-shaped sections 306 are oriented so as to present their openings facing each other.

Each central part 112 is positioned between and in line with two lateral walls 114 of two different U-shaped sections 306 and delimits the cavity 102.

For each central wall 112, the printhead 100 comprises a metal plate 310 that is secured to the central wall 112 and is at the rear of the central wall 112 with respect to the cavity 102. The metal plate 310 has a width greater than the width $l_1$ of the central wall 112 and extends on either side of the central wall 112 in the direction of the width of the central wall 112. The metal plate 310 is positioned at the rear of the lateral walls 114 framing the associated central wall 112.

The central wall 112 and the metal plate 310 thus form a step on either side of the central wall 112 against each of which a lateral wall 114 comes into abutment while also bearing against the metal plate 310 to ensure correct positioning.

Furthermore, the thickness of the central wall 112 is equal to the thickness of the lateral walls 114 to ensure a flat surface in the cavity 102.

The central wall 112 and the metal plate 310 can constitute a single component or be two components secured to one another.

The cooling system 120 here takes the form of two heat exchangers 312 in which the tubes 122 circulate, where each heat exchanger 312 is set against the rear of one of the metal plates 310.

If needed, to prevent an electrical short-circuit between a metal plate 310 and the associated heat exchanger 312, a protective plate 314 consisting of an electrically insulating material is disposed between the metal plate 310 and the heat exchanger 312.

To hold the various elements together, the printhead 100 also comprises a housing 316 consisting of four lateral plates 316a-d that are secured to each other around the other elements. The securing is provided by any suitable means such as for example screws.

The top plate 302 comes above the housing 316.

Above the top plate 302, the printhead 100 comprises a connection 318 in the form of a funnel descending towards the slot 304 and around which a conduit that brings the dough is secured.

Downstream of the outlet 106, the printhead 100 comprises two blocks 320 disposed on either side of the outlet 106. Each block 320 has an inclined plane 322 that extends the large wall 108 and moves away outwards while progressing in the direction of the discharge direction F, i.e. from top to bottom. The presence of the inclined planes 322 prevents the appearance of a hot spot just after the central walls 112 and allows an expansion of the dough if required because of the internal overpressure of the dough leading to a possible phenomenon of the "die swell" type.

The invention claimed is:

1. A printhead for a 3D printer, said printhead comprising:
    two large walls parallel to each other and facing each other, and
    two small walls parallel to each other and facing each other, and perpendicular to the large walls,
    where the four walls define between them a cavity taking the form of a right-angled parallelepiped that extends between an inlet and an outlet that face each other and define between them a discharge direction,
    where each small wall is produced from an electrically non-conductive material,
    where, in the cavity, each large wall comprises a central wall and two lateral walls on either side of the central wall,
    where each lateral wall is produced from an electrically non-conductive material, and
    where the two central walls face each other, are produced from an electrically conductive material, and are intended to be electrically connected to an electricity generator that generates an alternating current and a difference in electrical potential between them.

2. The printhead according to claim 1, wherein the cavity has a length, wherein the central wall has a width that is parallel to and less than the length $L_0$, and wherein each lateral wall has a width that is equal to half the difference between the length of the cavity and the width u of the central wall.

3. The printhead according to claim 1, wherein, for each large wall, the central wall and the two lateral walls constituting said large wall are coplanar in the cavity.

4. The printhead according to claim 1, wherein it comprises a cooling system arranged at the rear of the large walls with respect to the cavity.

5. The printhead according to claim 1, wherein it comprises a metal plate that is secured to the central wall and is at the rear of the central wall with respect to the cavity, where the metal plate has a width greater than the width ($l_1$) of the central wall and extends on either side of the central wall, wherein each small wall and the two lateral walls that are adjacent form a single element taking the form of a U-shaped section, wherein each central wall is positioned between and in line with the two lateral walls of two different U-shaped sections and wherein each metal plate is positioned at the rear of the lateral walls framing the associated central wall.

6. The printhead according to claim 4, wherein the cooling system takes the form of two heat exchangers in which tubes supplied with a heat-transfer fluid circulate, where each heat exchanger is set against the rear of one of the metal plates.

7. The printhead according to claim 6, wherein, for each heat exchanger, it comprises a protective plate consisting of an electrically insulating material and disposed between the metal plate and the heat exchanger.

8. The printhead according to claim 1, wherein, downstream of the outlet, the printhead comprises two blocks disposed on either side of the outlet, and wherein each block has an inclined plane that extends the large wall and moves away outwards while progressing in the direction of the discharge direction (F).

9. A 3D printer comprising a printhead according to claim 1.

10. The printhead according to claim 5, wherein the cooling system takes the form of two heat exchangers in which tubes supplied with a heat-transfer fluid circulate, where each heat exchanger is set against the rear of one of the metal plates.

* * * * *